(12) United States Patent
Gutsch et al.

(10) Patent No.: US 7,993,771 B2
(45) Date of Patent: Aug. 9, 2011

(54) ACCUMULATOR WITH PROTECTION AGAINST MECHANICAL DAMAGE

(75) Inventors: Andreas Gutsch, Luedinghausen (DE); Holger Mikus, Kamenz (DE); Joerg Kaiser, Kamenz (DE); Claus-Rupert Hohenthanner, Hanau (DE); Tim Schaefer, Niedersachswerfen (DE)

(73) Assignee: Li-Tec Battery GmbH, Kamenz (DE)

( * ) Notice: Subject to any disclaimer, the term of this patent is extended or adjusted under 35 U.S.C. 154(b) by 0 days.

(21) Appl. No.: 12/838,766

(22) Filed: Jul. 19, 2010

(65) Prior Publication Data

US 2011/0059353 A1    Mar. 10, 2011

Related U.S. Application Data

(63) Continuation of application No. 12/561,018, filed on Sep. 16, 2009, now abandoned.

(30) Foreign Application Priority Data

Sep. 17, 2008   (DE) .......................... 10 2008 047 615

(51) Int. Cl.
    *H01M 2/10*  (2006.01)

(52) U.S. Cl. .......... 429/99; 429/100; 429/158; 429/159; 29/623.5

(58) Field of Classification Search ............... 429/99, 429/100, 158, 159, 163; 29/623.5
See application file for complete search history.

(56) References Cited

U.S. PATENT DOCUMENTS

| | | | |
|---|---|---|---|
| 3,064,069 A | | 11/1962 | Auge |
| 4,137,376 A | * | 1/1979 | Clegg et al. ................... 429/104 |
| 5,670,272 A | | 9/1997 | Cheu et al. |
| 6,040,085 A | | 3/2000 | Cheu et al. |

FOREIGN PATENT DOCUMENTS

JP            56030248 A  *  3/1981

\* cited by examiner

*Primary Examiner* — Gregg Cantelmo
(74) *Attorney, Agent, or Firm* — Greenblum & Bernstein, P.L.C.

(57) ABSTRACT

An accumulator comprises at least one galvanic cell and a receiving device for supporting the galvanic cell(s) of the accumulator. The receiving device comprises at least one protecting wall for receiving energy by means of elastic and/or plastic deformation. The protecting wall encases the at least one galvanic cell at least partially and has a thickness which is at least partially less than about $1/10$ of the characteristic edge length of the at least one galvanic cell.

20 Claims, 1 Drawing Sheet

US 7,993,771 B2

ACCUMULATOR WITH PROTECTION AGAINST MECHANICAL DAMAGE

CROSS-REFERENCE TO RELATED APPLICATIONS

The present application is a continuation of U.S. application Ser. No. 12/561,018, filed Sep. 16, 2009 now abandoned, which claims priority under 35 U.S.C. §119 of German Patent Application No. 10 2008 047 615.3, filed Sep. 17, 2008. The disclosures of these applications are expressly incorporated by reference herein in their entireties.

BACKGROUND OF THE INVENTION

1. Field of the Invention

The present invention refers to an accumulator. The invention is described with respect to lithium-ion accumulators to supply the drivetrain of motor vehicles. The invention may be used independent of the type of the accumulator or independent of the type of the drive.

2. Discussion of Background Information

Accumulators for supplying the drivetrain of motor vehicles are known. Some of these types of accumulators share the feature that their galvanic cells are not sufficiently protected against damaging. Accordingly, it would be advantageous to be able to protect an accumulator or its galvanic cells against mechanical damaging with an adequate protecting device.

SUMMARY OF THE INVENTION

The present invention provides an accumulator which comprises at least one galvanic cell and a receiving device for holding the at least one galvanic cell. The receiving device comprises at least one protecting wall for absorbing energy by means of elastic and/or ductile deformation. The at least one protecting wall surrounds the at least one galvanic cell which is held by the receiving device at least partially and has a thickness which is at least in parts less than about 1/10 of the characteristic edge length of the at least one galvanic cell.

In one aspect, at least one protecting wall may surround the at least one galvanic cell which is held by the receiving device at least partially and with positive locking.

In another aspect, the at least one galvanic cell may comprise a gas-tight jacket and the at least one protecting wall may be capable of absorbing more strain energy than the gas-tight jacket.

In another aspect, the at least one protecting wall may comprise at least one first material which is electrically non-conducting at a voltage which is similar to the nominal voltage of the accumulator and/or may comprise at least partially a covering layer. For example, the at least one first material may comprise at least one curable polymer. Further, the at least one first material may be capable of forming cavities during curing.

In another aspect of the accumulator of the present invention, the density of the at least one protecting wall may be less than about 1,500 kg/m³, e.g., less than about 150 kg/m³, or less than about 15 kg/m³ and/or the density of the at least one protecting wall may be higher than about 5 kg/m³.

In yet another aspect, the at least one first material of the at least one protecting wall may further comprise at least one filler material which is able to at least partially join in with the cured first material by material engagement and the cured first material may at least partially surround the at least one filler material, and the cured first material with the filler material may show a larger Young's modulus and/or a larger tensile strength than the cured first material without the filler material.

In a still further aspect, the at least one protecting wall may further comprise at least one second material which has a larger thermal conductivity than the at least one first material and is capable of passing through a phase change at predetermined conditions, at least partially, which second material may show a larger absorptivity with respect to the electrolyte of the galvanic cell than the at least one first material and/or may form at least one channel which may be permeable.

In another aspect, the at least one protecting wall may further comprise filling particles, the density of which is lower than the density of the at least one first material.

The present invention also provides a method of manufacturing the accumulator of the present invention as set forth above (including the various aspects thereof). The method comprises at least (a) arranging the at least one galvanic cell in a mold corresponding to the shape of the accumulator; and (b) filling the mold, at least partially, with a material for forming the at least one protecting wall.

In one aspect of the method, at least one further substance may be added to the material for use in (b) for affecting a viscosity of the uncured material for forming the at least one protecting wall.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

Figure 2:
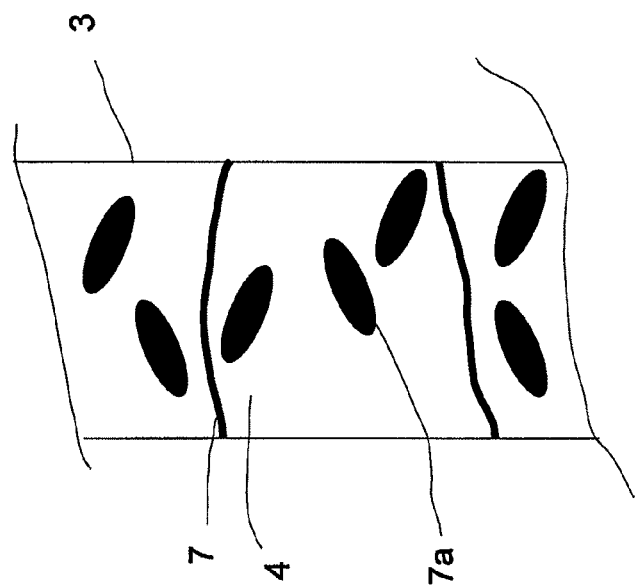
FIG. 2 shows an enlarged section of the protecting wall 3.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

An accumulator according to the present invention comprises at least a galvanic cell and a receiving device. The receiving device is intended to hold the galvanic cells of the accumulator. The receiving device comprises at least a protecting wall. This protecting wall is intended to absorb energy by means of elastic and/or ductile deformation. At least partially, the protecting wall surrounds the at least one galvanic cell which is held by the receiving device. The thickness of the protecting wall is at least partially less than about 1/10 of the characteristic edge length of the at least one galvanic cell held by the receiving device.

The present accumulator is an apparatus intended to store energy. The energy is stored as chemical energy in the at least one galvanic cell of the accumulator. To supply an electrical drive, chemical energy is at first converted to electrical energy. During a charging process of the accumulator the conversion of electrical energy to chemical energy is executed in the opposite direction.

The present accumulator comprises at least one galvanic cell. The construction of a galvanic cell is commonly known and thus is not explained here. To explain the mode of action of the invention it shall suffice to state that the galvanic cell also includes an electrolyte. Also, a galvanic cell is usually surrounded by a gas-tight jacket. This jacket serves to prevent the galvanic cell from the influx of water or steam. To achieve this, the jacket is usually designed to be a gas tight film, at least partially, for instance to be a metal film.

The present accumulator comprises a receiving device. This device is also intended to support the at least one galvanic cell of the accumulator. Supporting shall be understood to mean that the at least one galvanic cell of the accumulator remains within the combination of the accumulator and its further components during the intended use of the accumulator.

The present receiving device comprises at least one protecting wall. The protecting wall serves the purpose to prevent the at least one galvanic cell of the accumulator from mechanical damaging, too. So the protecting wall or its material are intended to absorb impacting mechanical energy through elastic and/or ductile deformation and to hold mechanical energy off the at least one galvanic cell, for example. An elastic deformation is preferably inverted after consuming the impacting mechanical energy. Depending on the sort and amount of mechanical energy or the sort of the body carrying said energy, the elastic deformability of the protecting wall may not suffice. The protecting wall is designed to also absorb mechanical energy through ductile deformation. So, a body carrying energy or being loaded with a force will intrude into the protecting wall by a certain distance and will displace its material. This may result in a breaking of the protecting wall. The energy absorbed in such a way is not available to further damaging the accumulator or its galvanic cells. Also, the impacting mechanical energy is spread onto a larger surface by the protecting wall.

Kinetic or potential energy presently acts on the accumulator through a thrust or blow or through a force. This will act on the accumulator or a galvanic cell through an arbitrary body over a time interval and/or a certain distance.

At least partially, the protecting wall surrounds the at least one galvanic cell. Economical considerations of material usage and cost of manufacturing, available space, design of the accumulator, number or arrangement of several galvanic cells, if applicable, site of operation of the accumulator, kind and extent of the expected damaging effects and other conditions will define the extent by which the protecting wall surrounds the at least one galvanic cell. Only one of several boundary surfaces of an accumulator may feature a protecting wall.

The thickness of the protecting wall is chosen depending on the expected peril, the weight of the accumulator or the material used for the protecting wall. To maintain a desired specific power or energy with respect to volume or weight of the accumulator, the protecting wall is chosen to be as thin as possible. The protecting wall is chosen to be as thick as necessary to provide the protection required. The thickness of the protecting wall is chosen depending on the load and need not be uniform. The thickness of the protecting wall is to be chosen in relation to the characteristic edge length. Preferably, the thickness of the protecting wall is at least partially less than about $1/10$ of the characteristic edge length of the at least one galvanic cell held by the receiving device, preferably less than about $1/25$ of this characteristic edge length. Alternatively, the thickness of the protecting wall is dimensioned in mm. Preferably, the thickness of the protecting wall is at least partially from about 0.01 mm to about 100 mm, preferably from about 0.1 mm to about 20 mm, most preferred from about 0.5 mm to about 10 mm.

The characteristic edge length of a galvanic cell is a reference size. It is calculated as the mean average of the lengths of the edges of the galvanic cell and accounts for the geometry of the galvanic cell. For instance, in case of a block-shaped galvanic cell, the three different lengths of edges of the rectangular block are used. In case of a cylindrical cell or a rotationally symmetric cell, the lengths along the rotational axis and the radius of the base area are used. In case of a prismatic cell with arbitrary base area, a substitute body with the same volume is defined, at first. Its circular base area has the same surface area as the base area of the prism. Then the length of the rotational axis and the radius of the substitute base area are used, similar to the case of the cylindrical cell. Usually, several uniform galvanic cells are processed to an accumulator. Otherwise, the mean average of the characteristic edge lengths of the different galvanic cells is to be defined and to be used. Presently, the dimension defined in this manner is to be understood as the "mean characteristic edge length". In this case, the mean characteristic edge length is to be used in lieu of the characteristic edge length.

By design of an accumulator or its receiving device according to the invention with a protecting wall, occurring damaging mechanical loads may be held off the galvanic cells of the accumulator. So, the accumulator is prevented from damaging and the underlying aim is met. Further advantages of the invention can be taken from the following non-limiting embodiments.

Advantageously, the protecting wall surrounds at least partially the at least one galvanic cell held by the receiving device by positive locking. The degrees of freedom of motion of a galvanic cell are significantly reduced by surrounding with positive locking. Thereby, the protecting wall abuts tightly on the at least one galvanic cell. If the accumulator comprises a plurality of galvanic cells, which are arranged side by side and in a row in close contact similar to rows and columns of a table, the degrees of freedom of motion of the galvanic cells arranged inside are limited by their neighbors. Thereby, the protecting wall imposes elastic restoring forces on to the galvanic cells surrounded with positive locking, preferably. Preferably, the at least one galvanic cell is at least partially encapsulated by this protecting wall. So, good positive locking is achieved between the protecting wall and the at least one galvanic cell of the accumulator. This is done to save space, to hold the at least one galvanic cell within the receiving device and to prevent the accumulator from damaging through vibrations. This is achieved by choosing an appropriate material for the protecting wall and the design of the protecting wall. So, the protecting wall preferably shows high internal friction. This helps to absorb impacting energy from vibrations, too. The protecting wall surrounds the at least one galvanic cell to protect against moisture, corrosion and other damaging substances. After a failure of a galvanic cell, it may be removed from this receiving device and may be replaced, advantageously.

Advantageously, a galvanic cell comprises a gas tight jacket. This is true in case of using an electrolyte with lithium ions. To aid this, the gas tight jacket may be manufactured from a metal film, for instance. The protecting wall is able to absorb more strain energy than the gas tight jacket by choosing an appropriate wall thickness and material. To this end, the protecting wall preferably comprises stays and/or reinforcing ridges. The term 'strain energy' as well as methods for its calculation are defined in the literature concerning engineering mechanics.

Advantageously, the protecting wall also acts to isolate electrically. To this end the protecting wall comprises a first material. The protecting wall acts to isolate electrically at voltages similar to the nominal voltage of the accumulator. Most preferred, the protecting wall acts to isolate electrically at voltages which are equal to several times the nominal voltage of the accumulator. This is achieved by choosing an appropriate first material for the protecting wall. To this end, expected voltages need to be considered. Preferably, the first material isolates electrically at a voltage which is equal to about 10 times the nominal voltage of the accumulator, most preferred equal to about 100 times the nominal voltage of the accumulator.

Preferably, the protecting wall is equipped with at least one covering layer, at least partially. The at least one covering layer is arranged on an outside surface of the protecting wall. For instance, a covering layer is arranged on an inside surface of the protecting wall, wherein the inside surface faces the galvanic cell(s) of the accumulator. Optionally, the outer surface of the protecting wall is equipped with a covering layer. Preferably, the protecting wall comprises a covering layer in regions which are exposed to particular wear, to avoid grit, for instance. Depending on the selection, the covering layer will act against chemical and/or thermal exposure, preferably. The covering layer acts in a flame-retarding manner, for instance. In case of a fire, such a covering layer may expand and/or produce foam, carbonize or become a ceramic. Preferably, a protecting wall comprises several different covering layers at the same time.

Advantageously, the first material of the protecting wall is a curable polymer. Preferably, polymers are chosen which can be manipulated easily, show low density, high ability to absorb energy, high ability to isolate electrically. Optionally, the first material may be a mixture of materials depending on what the protecting wall is subjected to. Preferably, a copolymer is chosen to form the first material to adapt the material properties to the expected exposures. The first material may be pretreated depending on the requirements of processing, if needed. For instance, the polymer may be chosen from a group including unsaturated polyester (UP), epoxy (EP), polyamides, polystyrenes.

Advantageously, the first material comprises cavities after curing. Preferably, the cavities are filled with a gas. The cavities are surrounded by a joisting of the first material. Compared to the solid first material, the first material with cavities shows higher values of moment of inertia, of bending stiffness, of density, of ability to absorb energy and/or of reversible deformation or of elastic strain. Preferably, the diameter of a substitute body of a cavity with similar volume is less than about 1/5 of the thickness of the protecting wall. Preferably, the cavities are distributed within the first material as evenly as possible. So, the protecting wall with a cured first material with cavities gains thickness and protective effect, too, while the specific power or energy with respect to volume and weight diminishes insignificantly.

The structure of the protecting wall may be compared to a frozen foam. This frozen foam of low density is able to bear a high bending load or a high impact loading in comparison. Depending on the material used and the curing conditions, the frozen foam may comprise various Young's moduli or permitted values of elastic strain. So the protecting wall will absorb energy through elastic or ductile strain while showing a low weight. This is also known from foamed plastic or metal foam.

Optionally, an auxiliary substance may be added to the first material. This auxiliary substance may expand at predetermined conditions, preferably before or while curing of the first material. Preferably, the auxiliary substance acts to improve foaming of the first material, for example as a propellant, acts to improve cohesion of the solid phase of the protecting wall, to improve curing of the participating polymers and/or to increase long term stability of the cured first material. Preferably, the at least one auxiliary substance is able to form a gaseous phase at predetermined conditions. In doing so, the gaseous phase is created as a result of a phase change of the auxiliary substance and/or as a result of a chemical reaction of the auxiliary substance while creating a gas, preferably. Preferably, the gaseous phase remains contained within the cavities of the cured material.

Preferably, the protecting wall is designed to be lightweight. Its density is less than about 1,500 kg/m$^3$, preferably less than about 150 kg/m$^3$, most preferred less than about 15 kg/m$^3$, and more than about 5 kg/m$^3$. So, the high specific power of the accumulator is maintained with respect to volume or weight. To this end, cavities are useful which are preferably filled with gas and are enclosed within the protecting wall.

Preferably, the first material (4) of the protecting wall (3) further comprises at least one filler material. It is capable of material engagement with the cured polymer of the first material (4), at least partially. Thereby the cured polymer surrounds this filler material, at least partially. This filler material acts such that the first material (4) after curing with the filler material features a higher Young's modulus and/or higher permitted values of elastic strain. Preferably, the filler material comprises a plurality of short rods or fibers, though other geometries are possible. These rods or fibers may be either arranged without order and distributed or are arranged as a woven fabric or a laid layer within the cured first material. Thereby, several layers of woven fabrics or laid layers may be put one upon the other with different directions of the fibers. The presence of the filler material alters the properties of the first material (4). When compared with the polymer of the first material (4), the fibers show increased Young's modulus and/or permitted values of elastic strain in their axial direction. Depending on the arrangement of the fibers, the cured first material can be set up to have different material properties with respect to the axes of a Cartesian coordinate system. The rods or fibers may be made from glass, carbon or an aramide, for instance.

Preferably, the protecting wall further comprises a second material. The second material shows a larger thermal conductivity than the first material, preferably. For instance, aggregations show predetermined shapes, such as wire sections, films, a net, woven fabrics, non-woven fabrics, rounded geometries like beads, films or strips of film. Preferably, such aggregations are arranged within the protecting wall in an aligned manner and are inserted during the manufacturing of the protecting wall. So, thermal energy may be added or removed. Preferably, the second material passes through a phase change at predetermined conditions to absorb or release thermal energy. These predetermined conditions are chosen depending on the operating conditions of the accumulator. Preferably, the second material is arranged in rounded, distributed aggregations. The diameter of a ball shaped substitute body with a volume similar to the volume of an aggregation is less than half thickness of the protecting wall, preferably less than about 1/10 of its thickness.

There is a variation of the volumes of several aggregations of the second material within a range, which offers advantages with respect to their application and the cost of manufacturing. Preferably, the second material shows a higher absorptivity with respect to the electrolyte than the first material. Emerging electrolyte may be absorbed particularly by the second material after damage to the jacket of a galvanic cell. In doing so, the proximity is protected from the electrolyte.

Preferably, the second material is designed to be at least one solid body, forming a channel. The channel of this solid body may accept a cooling agent or may be passed through by a cooling agent. So, thermal energy may be delivered or dissipated. Preferably, the second material acts flame-retarding. For instance, the second material may expand and/or produce a foam during a fire, carbonize or convert to a ceramic. The damaging effects of a fire upon the proximity of the accumulator may at least be reduced in this manner.

An advantageous embodiment of the protecting wall (3) further comprises several filling particles. The shape of a filling particle mainly results from the outcome of the manufacturing of the filling particle. It is not compulsory that the filling particles have the same shape. For instance, the filling particles may show a ball-shaped, an ellipsoidic, a drop shaped or any other geometry which is mainly rotationally symmetric. The mean diameter of a filling particle, which is alternatively determined by measuring a ball of similar volume (substitute body), is within a range of from about 0.01 to about 5,000 microns, preferably from about 0.1 to about 1,000 microns, most preferably from about 1 to about 400 microns. The mean diameters of the filling particles scatter about an averaged mean diameter of a multitude of filling particles. Preferably, the filling particles are predominantly hollow and/or show closed surfaces. The density of a filling particle preferably is less than the density of the cured first material. Preferably, the filling particles comprise at least one solid material such as glass or plastic, for instance.

A mold and at least one material are required to manufacture a receiving device of the accumulator according to the present invention. The at least one galvanic cell of the accumulator is arranged within the mold. Usually, the accumulator comprises a multitude of galvanic cells which are electrically connected by serial connection/parallel connection. In this case, all galvanic cells of the accumulator are arranged within the mold. Within the mold, the galvanic cells are prevented from unintended displacement against each other with spacers or with the help of an auxiliary device from outside the mold, for instance. Extra necessary devices of the accumulator may be arranged within the mold. Next, the designated chambers in the mold are at least partially filled with the material for forming the protecting wall. If the protecting wall has to include further materials or parts, they are added to designated chambers of the mold.

Optionally, the galvanic cells and the produced protecting wall remain in the mold. Then the mold becomes the casing of the accumulator. In this case, the shape of the mold, i.e. its material or its geometry, is adapted to the requirements of the operation of the accumulator, too. In this case, the mold may have one or more parts, may be made from metal and/or plastic, may be equipped with devices to connect to the motor vehicle, and may be designed with openings to lead in electric cables and/or other supply lines.

Optionally, a further substance may be added to the material for forming the protecting wall, whereby the viscosity of the mixture is altered with respect to the uncured material. In doing so, the flowability of the first material is affected during its processing to become the protecting wall. Preferably, the further substance is a powdery solid matter, most preferably Aerosil®. Also, a different solid matter may be used as further substance, if the viscosity of the pourable mixture of the further substance and said material is to be different from the viscosity of said material.

Figure 1:
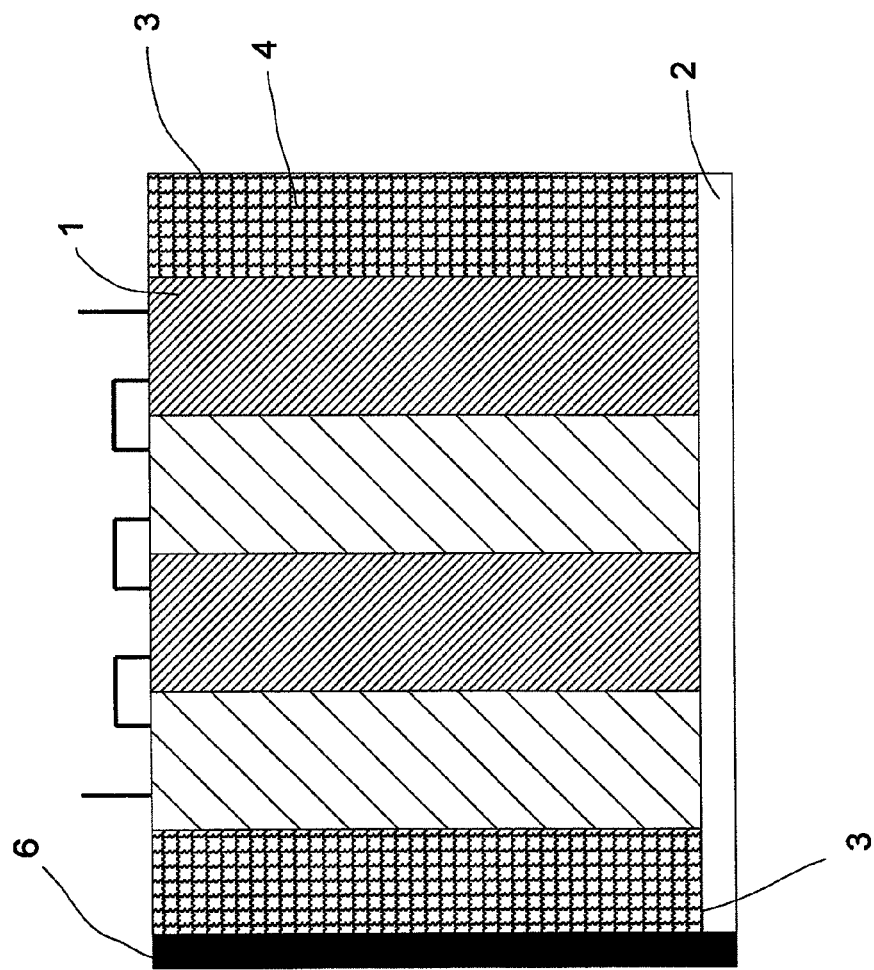
FIG. 1 shows a sectional view of an accumulator according to the present invention.

FIG. 1 shows a sectional view of an accumulator according to the present invention. This accumulator comprises four galvanic cells 1 in serial connection plus a receiving device 2. The serial connection of the galvanic cells 1 is symbolized by three bridges and two pins on the upper ends of the galvanic cells 1. The receiving device 2 is provided with a protecting wall 3. The cross section of this protecting wall 3 is depicted to the left and to the right of the galvanic cells 1. The thickness of the protecting wall 3 is dimensioned to be less than a tenth of the mean characteristic edge length of the galvanic cells 1 held. Pre-foamed and aeriferous beads 4 made of polystyrene serve as first material of the protecting wall 3. The beads 4 are expanded with the help of hot steam. Thereby, the air contained by the beads expands, the beads increase to become balls. The present balls 4 of polystyrene connect to each other. The polystyrene 4 expanded in this manner has a density of about 70 kg/m$^3$, for instance. The design of the protecting wall 3 is depicted in FIG. 1 schematically, only. In fact, the polystyrene forms the walls of the balls 4 and their inner bars. The voids between the bars of a ball 4 are filled with air. The mass fraction of the polystyrene is negligible. By choosing polystyrene as first material 4, the protecting wall 3 is not electrically conductive with respect to the nominal voltage of the accumulator, i.e., 12V. The small density of the protecting wall 3 causes the specific power or energy of the accumulator with respect to volume of weight not to decrease significantly.

The protecting wall is produced by using pre-foamed aeriferous beads 4 from polystyrene and a mold. At first, the galvanic cells 1 of the accumulator are arranged within the mold and are jammed against each other to avoid undesired displacements. Next, the beads 4 are added to designated chambers within the mold. During the following step, the mold with its content is exposed to the conditions required to expand the beads. The beads 4 are exposed to hot steam, thereby. The beads 4 will expand and fill the designated chambers to fix the galvanic cells 1. Thereby, the galvanic cells 1 are surrounded by foam only by as much as to leave the electrical contact surfaces of the galvanic cells to protrude from the protecting wall 3. In a further step the accumulator may be removed from the mold and the mold may be reused. After their failure, individual galvanic cells 1 may be removed from the receiving device 2 and may be replaced.

The mold of this embodiment also forms the casing of the accumulator. The casing is provided with corresponding means for connection and openings. Also the casing is adapted to being installed in the motor vehicle with respect to its shape. The casing also offers extra protection of the accumulator. The casing is made from steel plate, which is folded and welded. The casing may also be manufactured entirely/partially from plastic or may be manufactured with other manufacturing methods, too.

Alternatively, the designated mold is first filled with a first material 4. The galvanic cells 1 are connected to a supporting unit, which is an auxiliary production means, which supports the galvanic cells 1 against one another immovably. Then the galvanic cells 1 are dipped into the first material 4. The supporting unit is connected to the mold. The processes of expanding and curing of the first materials 4 follow. Afterwards the galvanic cells 1 are not entirely surrounded by the protecting wall 3.

FIG. 2 shows an enlarged detail of the protecting wall 3 of a further embodiment. The protecting wall 3 shows an expandable polymer 4 and a second material 7 with high thermal conductivity, both serving as first material. The second material 7 features a significantly larger thermal conductivity than the first material 4. The second material 7 is designed to have oblong, irregular strips. By its shape and design, the second material 7 contributes to remove thermal energy from a galvanic cell 1 contacting the protecting wall 3.

Another second material 7a passes through a phase change at predetermined conditions. The second material 7a forms solid matter at a predetermined temperature of the accumulator. The second material 7a is chosen such that its melting temperature exceeds the predetermined operating temperature of the accumulator only by a small margin. If the temperature of a galvanic cell 1 in contact exceeds the melting temperature of the second material 7a, it passes through a phase change and becomes a liquid, partially. The aggregation of the second material 7a will keep the melting temperature until it has been entirely converted to a liquid. In doing so, the aggregation of the second material 7a absorbs thermal energy and contributes to cooling a galvanic cell 1 in contact.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. An accumulator, wherein the accumulator comprises at least one galvanic cell and a receiving device for holding the at least one galvanic cell, which receiving device comprises at least one protecting wall for absorbing energy by at least one of elastic and ductile deformation, wherein the at least one protecting wall (i) surrounds the at least one galvanic cell which is held by the receiving device at least partially, (ii) has a thickness which is at least partially less than about 1/10 of a characteristic edge length of the at least one galvanic cell, and (iii) comprises at least one first material that is electrically non-conducting at a voltage which is similar to the nominal voltage of the accumulator and at least one filler material that is able to at least partially join with the cured first material by material engagement, the cured first material at least partially surrounding the at least one filler material, and wherein the cured first material with the filler material shows at least one of a larger Young's modulus and a larger tensile strength than the cured first material without the filler material.

2. The accumulator of claim 1, wherein the at least one protecting wall surrounds the at least one galvanic cell which is held by the receiving device at least partially and by positive locking.

3. The accumulator of claim 1, wherein that the at least one galvanic cell comprises a gas-tight jacket and wherein the at least one protecting wall is capable of absorbing more strain energy than the gas-tight jacket.

4. The accumulator of claim 1, wherein the at least one first material comprises at least one curable polymer.

5. The accumulator of claim 4, wherein the at least one first material is capable of forming cavities during curing.

6. The accumulator of claim 1, wherein the at least one first material comprises polystyrene.

7. The accumulator of claim 1, wherein the at least one protecting wall comprises expanded polystyrene beads.

8. The accumulator of claim 1, wherein a density of the at least one protecting wall is less than about 1,500 kg/m$^3$.

9. The accumulator of claim 1, wherein a density of the at least one protecting wall is less than about 150 kg/m$^3$.

10. The accumulator of claim 1, wherein a density of the at least one protecting wall is less than about 15 kg/m$^3$.

11. The accumulator of claim 1, wherein a density of the at least one protecting wall is higher than about 5 kg/m$^3$.

12. The accumulator of claim 1, wherein the at least one protecting wall further comprises filling particles, a density of which is lower than a density of the at least one first material.

13. The accumulator of claim 12, wherein the filling particles have an average diameter of from about 0.01 to about 5,000 microns.

14. The accumulator of claim 12, wherein the filling particles have an average diameter of from about 1 to about 400 microns.

15. A method of manufacturing the accumulator of claim 1, wherein the method comprises at least
    (a) arranging the at least one galvanic cell in a mold corresponding to a shape of the accumulator; and
    (b) filling the mold, at least partially, with a material for forming the at least one protecting wall.

16. The method of claim 15, wherein at least one further substance is added to the material for use in (b) for affecting a viscosity of the uncured material for forming the at least one protecting wall.

17. The method of claim 15, wherein the method further comprises (c) curing the material for forming the at least one protecting wall of (b).

18. The method of claim 15, wherein the mold is used as a casing of the accumulator.

19. The method of claim 15, wherein the material comprises polystyrene.

20. The method of claim 19, wherein the polystyrene comprises expanded polystyrene beads.

* * * * *